Sept. 6, 1966     I. C. BENTZ     3,271,433
PROCESS FOR SEMI-CONTINUOUS HYDROGENATION OF FAT
Filed June 17, 1963
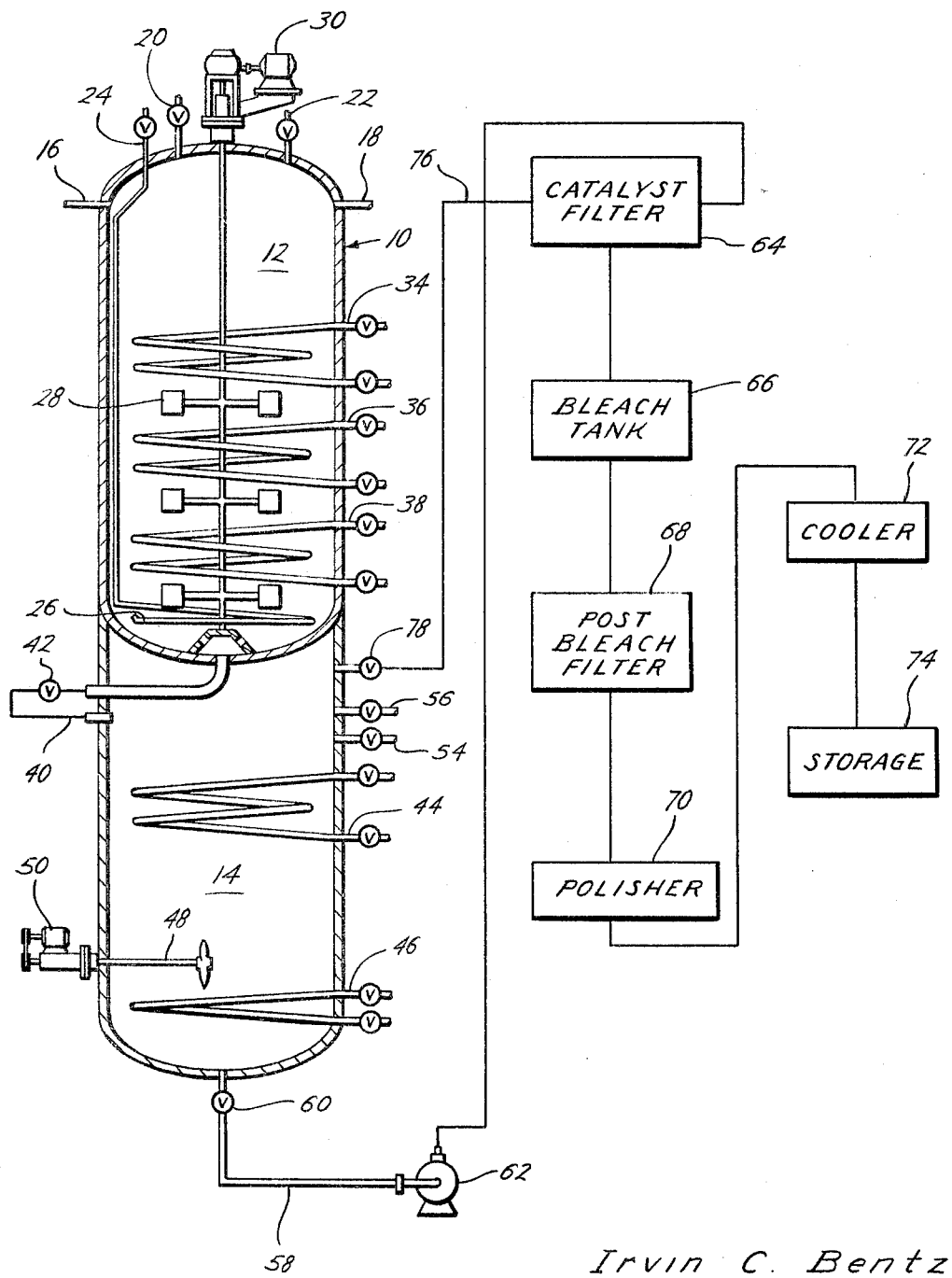
Irvin C. Bentz
INVENTOR.
BY James F. Weiler
Jefferson D. Giller
William A. Stout
Paul L. DeVerter II
ATTORNEYS United States Patent Office 3,271,433
Patented Sept. 6, 1966

3,271,433
PROCESS FOR SEMI-CONTINUOUS
HYDROGENATION OF FAT
Irvin C. Bentz, Houston, Tex., assignor to Anderson, Clayton & Co., Houston, Tex., a corporation of Delaware
Filed June 17, 1963, Ser. No. 288,387
5 Claims. (Cl. 260—409)

This invention relates to a semi-continuous process for the hydrogenation of fat and more particularly to such a process in which the hydrogenated fat is removed from the hydrogenator immediately upon completion of the hydrogenation.

Normally, in the hydrogenation of edible fats, particularly various oils, the hydrogenated fat, after the actual hydrogenation step, is given post hydrogenation treatment such as filtering, bleaching and degassing and then passed to storage. It is conventional for the hydrogenated fat to be cooled in the hydrogenator, removed from the hydrogenator, and placed in open storage tanks before it is given this post hydrogenation treatment. Because fat is hydrogenated at elevated temperatures the fat is cooled in the hydrogenator in the absence of oxygen prior to being placed in these open containers to prevent the deleterious effects of oxygen upon heated fat. This is obviously time consuming. To overcome this difficulty the hydrogenated fat is sometimes piped directly from the hydrogenator to and through the post hydrogenating treatment prior to storage. By this latter method the hydrogenated fat is moved in the absence of oxygen, however it takes a longer time for the fat to pass through the post hydrogenation treatment to storage than it does to drain from the hydrogenator and as a result the hydrogenator is unavailable for a considerable period of time to receive another batch of fat for hydrogenation.

It is to overcome these problems that the present invention is directed.

It is a general object of the present invention to provide a semi-continuous process of hydrogenating fat, such process including post hydrogenation treatment in which the hydrogenated fat is removed from the hydrogenator immediately upon the completion of hydrogenation and yet is not exposed to air or other sources of oxygen prior to post hydrogenation treatment.

It is another object of the present invention to provide such a process in which the hydrogenated fat may be removed from the hydrogenator immediately upon completion of the hydrogenation without the necessity of awaiting post hydrogenation treatment.

A further object is to provide such a process in one form of which the hydrogenated oil is subject to degassing immediately upon its removal from the hydrogenator.

Other objects and advantages are disclosed by the accompanying drawing illustrating partially diagrammatically the preferred apparatus for carrying out the process of the present invention.

Broadly speaking, the invention is of a semi-continuous process of hydrogenating fat, including post hydrogenation treatment, which process comprises the steps of (a) hydrogenating a batch of fat in the absence of oxygen in a first closed container, (b) flowing the batch of fat immediately upon completion of hydrogenation into a second closed container in the absence of oxygen, the second container having a capacity sufficient to hold the hydrogenated fat from the first container, (c) placing another batch of fat to be hydrogenated in the first container immediately upon emptying the first batch into the second container, and (d) flowing the batch of fat from the second container to at least the first stage of hydrogenation in the absence of oxygen and during the time required for hydrogenating the other batch of fat.

Returning now to the drawing, a generally cylindrical vessel 10 includes an upper closed container 12 which is a conventional hydrogenator and a lower closed container 14.

Fat to be hydrogenated enters the first container 12 through the fat inlet line 16 and catalyst enters through line 18. Hydrogation takes place under pressure. The upper limit of the pressure of the gas above the fat is controlled by the bleed line 20. Before and after hydrogenation gaseous pressure may be evacuated from the first container 12 by the vacuum line 22 connected to any conventional source, not shown, of vacuum. Hydrogen used in the chemical reaction of hydrogenation enters line 24, passes to the bottom of the first container 12 where it is evenly dispersed through a "spider" 26 for passing upwardly through liquid fat in the first container 12. Fat in the first container 12 is agitated by the agitator 28 driven by motor and gear assembly 30 and has its temperature controlled by the heating coils 34 and 36 and the cooling coil 38.

This construction is conventional and no further description thereof is necessary.

Communicating between the lower end of the first container 12 and the second container 14 is a line 40 having flow through it controlled by a valve 42 through which line 40 fat may flow from the first container 12 to the second container 14. The second container 14 is of sufficient size and capacity to hold all the fat hydrogenated in one batch in the first container 12. Within the second container 14 are the heating and cooling coils 44 and 46 and an agitator 48 driven by a motor and gear assembly 50. Inert gas such as nitrogen may be introduced into the second container 14 through line 54. A vacuum may be placed on this second container 14 by a vacuum system, not shown, connected to line 56.

From the lower end of the second container 14 a line 58 communicates through valve 60 and pump 62 with the various stages of post hydrogenation treatment such as a catalyst filter 64, a bleach tank 66, a post bleach filter 68, a polisher 70, and a cooler 72, and then with a storage tank 74. This post hydrogenation treatment apparatus downstream of the pump 62 is conventional and no further description thereof is deemed necessary.

As is well known in the trade, during some of the initial filtering of a catalyst the removal of catalyst is not complete. For that reason a bypass line 76 controlled by a valve 78 permits such initial quantities of fat from the catalyst filter 64 to be returned to the second container 14.

In carrying out the process of the present invention, a measured amount of liquid fat is pumped through line 16 into the first container 12, catalyst is added through line 18, air is evacuated from above the fat through line 22, and then line 22 is closed off. The fat is agitated by the agitator 28, heated to the desired temperature by the heating coils 34 and 36, and hydrogen is allowed to flow upwardly through the fat from the spider 26 building up pressure. After initial heating of the fat no more heat is necessary as the hydrogenation reaction is exothermic. The fat temperature is then controlled by the cooling coil 38.

While the batch of fat is being hydrogenated in the first container 12 all air is removed from the second container 14 through the line 56.

Upon completion of hydrogenation of the fat in the first container 12 the valve 42 in line 40 is opened, allowing the hydrogenated fat to flow immediately into the second container 14 by gravity and the pressure of the hydrogen in the first container 12. The valve 42 is then closed and another measured amount of fat and catalyst are fed into the first container 12 for hydrogenation.

The hydrogenated fat in the second container 14 is kept agitated by the agitator 48 and its temperature maintained at the desired level by the coils 44 and 46, normally by partial cooling. Immediately upon the hydrogenated fat being placed in the second container 14 the valve 60 in the line 58 is opened, the pump 62 is started, and the fat is forced through the post hydrogenation treatment in the absence of oxygen.

By the time the batch of fat in the first container 12 is hydrogenated the second container 14 will be emptied and ready to receive another batch of hydrogenated fat.

If desired, oxygen may be excluded from the second container 14 by introducing an inert gas such as nitrogen into it. In this event the pressure of the inert gas in the second container 14 is no greater, and preferably lower, than the pressure in the first container 12 during the time that the fat in the first container 12 is drained to the second container 14. Even when an inert gas is introduced into the second container 14 it is preferable that the pressure in this second container 14 always be less than atmospheric so that the second container 14 will act as a degasser. This allows the entrapped unreacted hydrogen in the fat to free itself from the fat while it is in the second container 14 so that if at any time in the post hydrogenation treatment the fat should come in contact with air there will be a minimum amount of hydrogen available and as a result a minimum danger of explosion.

From the foregoing discussion and description of the invention it is apparent that the objects set forth herein as well as others have been achieved. Those skilled in the art will realize that the principles of this invention may be applied in several ways, and accordingly, the invention is to be limited only by the spirit hereof and the scope of the appended claims.

What is claimed is:

1. In the semi-continuous process of hydrogenating fat, such process including post hydrogenating treatment, the steps comprising,
    (a) hydrogenating a batch of fat in the absence of oxygen in a first closed container,
    (b) flowing the batch of fat immediately upon completion of hydrogenation into a second closed container in the absence of oxygen, the second container having a capacity sufficient to hold all the hydrogenated fat from the first container,
    (c) placing another batch of fat to be hydrogenated in the first container immediately upon emptying the first mentioned batch into the second container, and
    (d) flowing the first mentioned batch of fat from the second container to at least a first stage of post hydrogenation treatment in the absence of oxygen and within the time required for hydrogenating the other batch of fat.

2. In the semi-continuous process of hydrogenating fat, such process including post hydrogenating treatment, the steps comprising,
    (a) hydrogenating a batch of fat in the absence of oxygen in a first closed container,
    (b) flowing the batch of fat immediately upon completion of hydrogenation into a second closed container in the absence of oxygen, the second container having a capacity sufficient to hold all the hydrogenated fat from the first container,
    (c) maintaining a lesser pressure in the second container than that existing in the first container during hydrogenation,
    (d) placing another batch of fat to be hydrogenated in the first container immediately upon emptying the first mentioned batch into the second container, and
    (e) flowing the first mentioned batch of fat from the second container to at least a first stage of post hydrogenation treatment in the absence of oxygen and within the time required for hydrogenating the other batch of fat.

3. In the semi-continuous process of hydrogenating fat, such process including post hydrogenating treatment, the steps comprising,
    (a) hydrogenating a batch of fat in the absence of oxygen in a first closed container,
    (b) flowing the batch of fat immediately upon completion of hydrogenation into a second closed container in the absence of oxygen, the second container having a capacity sufficient to hold all the hydrogenated fat from the first container,
    (c) introducing inert gas into the second container,
    (d) placing another batch of fat to be hydrogenated in the first container immediately upon emptying the first mentioned batch into the second container, and
    (e) flowing the first mentioned batch of fat from the second container to at least a first stage of post hydrogenation treatment in the absence of oxygen and within the time required for hydrogenating the other batch of fat.

4. The process of claim 1 including agitating the fat while in the second container.

5. The process of claim 1 including cooling of the fat while in the second container.

References Cited by the Examiner

UNITED STATES PATENTS 1,343,255   6/1920   Ellis _____ 260—409

CHARLES B. PARKER, *Primary Examiner.*

DANIEL D. HORWITZ, *Assistant Examiner.*